United States Patent [19]

Kaminow

[11] 4,198,115
[45] Apr. 15, 1980

[54] FABRY-PEROT RESONATOR USING A BIREFRINGENT CRYSTAL

[75] Inventor: Ivan P. Kaminow, Tinton Falls, N.J.

[73] Assignee: Bell Telephone Laboratories, Incorporated, Murray Hill, N.J.

[21] Appl. No.: 934,172

[22] Filed: Aug. 16, 1978

[51] Int. Cl.$^2$ .............................................. G02B 5/14
[52] U.S. Cl. ........................... 350/96.14; 331/94.5 C; 350/96.12; 350/355
[58] Field of Search ............... 350/96.12, 96.13, 96.14, 350/355, 356; 331/94.5 C, 94.5 F

[56] References Cited

U.S. PATENT DOCUMENTS 4,094,579  6/1978  McMahon et al. ........... 350/96.14 X

OTHER PUBLICATIONS

Smith et al., "Integrated Bistable Optical Devices," *Appl. Phys. Ltrs.*, vol. 33, No. 1, Jul. 1978, pp. 24-26.
Smith et al., "Electrooptic Nonlinear Fabry-Perot Devices," *IEEE Journal of Quantum Electr.*, vol. QE-14, No. 3, Mar. 1978, pp. 207-212.
Hsu et al., "Flip-Chip Approach to Endfire Coupling . . .," *Electronics Letters*, vol. 12, No. 16, Aug. 1976, pp. 404-405.
Steinberg et al., "Modal Fields of Anisotropic Channel Waveguides," *J.O.S.A.*, vol. 67, No. 4, Apr. 1977, pp. 523-533.
Findakly et al., "Optical Directional Couplers with Variable Spacing," *Applied Optics*, vol. 17, No. 5, Mar. 1978, pp. 769-773.
Kaminow et al., "Loss in Cleaved Ti-Diffused LiNbO$_3$ Waveguides," *Appl. Phys. Ltrs.*, vol. 33, No. 1, Jul. 1978, pp. 62-64.
Burns et al., "Mode Dispersion in Uniaxial Optical Waveguides," *J.O.S.A.*, vol. 64, No. 4, Apr. 1974, pp. 441-445.
Kaminow et al., "Nd:LiNbO$_3$ Laser," *IEEE Journal of Quantum Elect.*, vol. QE-11, No. 6, Jun. 1975, pp. 306-308.
Schmidt et al., "Metal-Diffused Optical Waveguides in LiNbO$_3$", *Appl. Phys. Ltrs.*, vol. 25, No. 8, Oct. 1974, pp. 458-460.
Kaminow et al., "Efficient Strip-Waveguide Modulator," *Appl. Phys. Ltrs.*, vol. 27, No. 10, Nov. 1975, pp. 555-557.

*Primary Examiner*—John K. Corbin
*Assistant Examiner*—John D. Lee
*Attorney, Agent, or Firm*—Daniel D. Dubosky

[57] ABSTRACT

The cleavage planes of a lithium niobate crystal (100) are used to provide the parallel surfaces (121 and 122) of a Fabry-Perot resonator established in a titanium diffused waveguide (110). To enable use of the extraordinary wave and therefore to provide a higher efficiency resonator, the waveguide is diffused into the crystal at a predetermined oblique angle ($\Psi$) with respect to the cleaved ends. The resonator is utilized in an optically pumped laser and in an electrically controllable Fabry-Perot resonator wherein the reflection provided by the cleaved ends is supplemented by multilayered dielectric mirrors (201 and 202 or 301 and 302) that are bonded to each of the cleaved ends. In the electrically controllable resonator a dielectric layer (330) is deposited over the surface of the crystal before electrodes (310 and 311) are formed on the layer parallel to the waveguide.

10 Claims, 6 Drawing Figures

FABRY-PEROT RESONATOR USING A BIREFRINGENT CRYSTAL

TECHNICAL FIELD

This invention relates to Fabry-Perot resonators and more particularly, to Fabry-Perot resonators that use a birefringent or uniaxial crystal as the resonator medium.

BACKGROUND OF THE INVENTION

Electrically controlled Fabry-Perot resonators have recently found use in a wide variety of optical devices. See the article "Electrooptic Nonlinear Fabry-Perot Devices", by P. W. Smith et al, *IEEE Journal of Quantum Electronics*, Vol. QE-14, No. 3, March 1978, pages 207–212. The device disclosed in this Smith et al article can perform a wide variety of functions including optical limiting, pulse shaping, and amplification, and be used as a switching and logic element. It is suggested on page 208 of the Smith et al article that an integrated optics version can be constructed by using an electro optic modulator incorporating a titanium diffused waveguide in a lithium niobate substrate as the resonator medium. To construct such a device requires that the end faces of the titanium diffused waveguide be flat and substantially perpendicular to the direction of propagation in the waveguide. To achieve this flat surface by the standard techniques of cutting and polishing the end of the crystal is extremely difficult since rounding of the edges almost always occurs with polishing, and the titanium diffused waveguide emerges at one edge of the crystal.

It is well known in the art that cleavage planes in the crystal can be utilized to provide reproducable and rectangular ends without difficulty. See for example, the article entitled "Flip-Chip Approach to Endfire Coupling Between Single Mode Optical Fibres and Channel Waveguides", by H. P. Hsu and A. F. Milton, Electronics Letters, Vol. 12, No. 16 pages 404–405, Aug. 5, 1976. Hence, a Fabry-Perot resonator for use in the Smith et al type devices can be constructed by using a lithium niobate crystal with cleaved ends as the parallel end faces of the resonator. Since lithium niobate has an index of refraction that is not radially different from that of air, an external mirror may be required at each of the cleaved ends to provide the necessary degree of reflection.

As pointed out in the Smith et al article, it is highly desirable to have as high a degree of sensitivity as possible in the electrically controllable Fabry-Perot resonator. That is, it is desirable to have a resonator medium which produces as large a phase shift as possible for any given change in voltage across the electrodes of the electrically controllable Fabry-Perot resonator.

SUMMARY OF THE INVENTION

One method of achieving increased electro-optic sensitivity in the Fabry-Perot resonator is to use the extraordinary wave for propagation in metal diffused waveguides that have been fabricated in certain birefringent crystals. The cleaving method, however, of achieving parallel surfaces in the waveguide requires a special crystal orientation. In lithium niobate, for example, use of the cleavage plane to achieve the parallel surfaces results in a crystal whose unique axis lies in a plane that is parallel to the top surface of the waveguide. Hence, propagation in the extraordinary wave requires that the radiation be polarized in a plane that is parallel to the top surface of the waveguide. If the strip waveguide is oriented so as to be perpendicular to the end faces or cleavage planes, orientation of the incoming radiations so as to position the wave normal vector perpendicular to the face results in a Poynting vector that is not in line with the waveguide axis. If, on the other hand, the incoming radiation is oriented so as to position the Poynting vector along the axis of the waveguide, the wave normal vector is no longer perpendicular to the end faces and the required standing wave pattern will not be set up in the Fabrey-Perot resonator.

Propagation of the extraordinary wave in a Fabry-Perot resonator using a birefringent crystal as the resonator medium and cleaved ends as the parallel surfaces of the resonator is achieved in accordance with the present invention by positioning the metal diffused waveguide in the medium at an oblique angle with respect to the cleaved ends of the crystal. Mirrors can be deposited on or cemented to each one of the cleaved end faces in order to increase the reflectivity. In lithium niobate, a titanium diffused waveguide is positioned in the crystal at an angle which is approximately two degrees from the vector that is normal to the cleaved end. As a result, use of this Fabry-Perot resonator as an electrically controlled Fabry-Perot resonator achieves an electro-optic effect that is about 3.1 times greater than a Fabry-Perot resonator that uses an ordinary wave in a waveguide that is normal to the cleaved ends. The required switching energy for such a resonator in a bistable device of the type disclosed in the Smith et al article is about 10 times less than a resonator that uses the ordinary wave.

In accordance with another aspect of the present invention, a dielectric buffer layer can be deposited over the crystal surface and metal electrodes are deposited on the dielectric layer along paths that are parallel to the metal diffused waveguide. By cementing mirrors on each cleaved end of the crystal an electrically controllable Fabry-Perot resonator is provided and may be used in turn to provide integrated optics versions of the many optical devices disclosed in the above-identified Smith et al article.

In accordance with still another aspect of the present invention multilayered dielectric mirrors are cemented to each cleaved end of the birefringent crystal to produce a laser that can be optically pumped by radiation that is coupled into the metal diffused waveguide. For some birefringent crystals such as neodymium doped LiNbO$_3$, the laser gain is greater for the extraordinary wave than for the ordinary wave.

DETAILED DESCRIPTION

In order to construct an embodiment of the present invention, it is first necessary to obtain a birefringent crystal such as lithium niobate, or lithium tantalate. The crystal should then be cut to the desired thickness and width and these cuttings must be oriented with respect to the crystal so as to present the cleavage plane at the ends of the crystals. The crystals can then be cleaved at each end in order to provide the proper length of Fabry-Perot resonator. To cleave the crystals, a scribe mark is made at one edge of the crystal plate. Two pairs of tweezers are then used on either side of the scribe mark in order to make the break. As is usual on cleaved surfaces, a number of terraces appear on the cleaved edge. It has been experimentally determined that the characteristic of the terraces and the nature of the cleaved end face depend upon whether the break starts near the negative or positive end of the c or unique axis of the crystal. See the article entitled "Loss in Cleaved Ti-Diffused LiNbO$_3$ Waveguides" by I. P. Kaminow and L. W. Stulz, *Applied Physics Letters*, Vol. 33, No. 1, July 1, 1978, pages 62-64.

Figure 5:
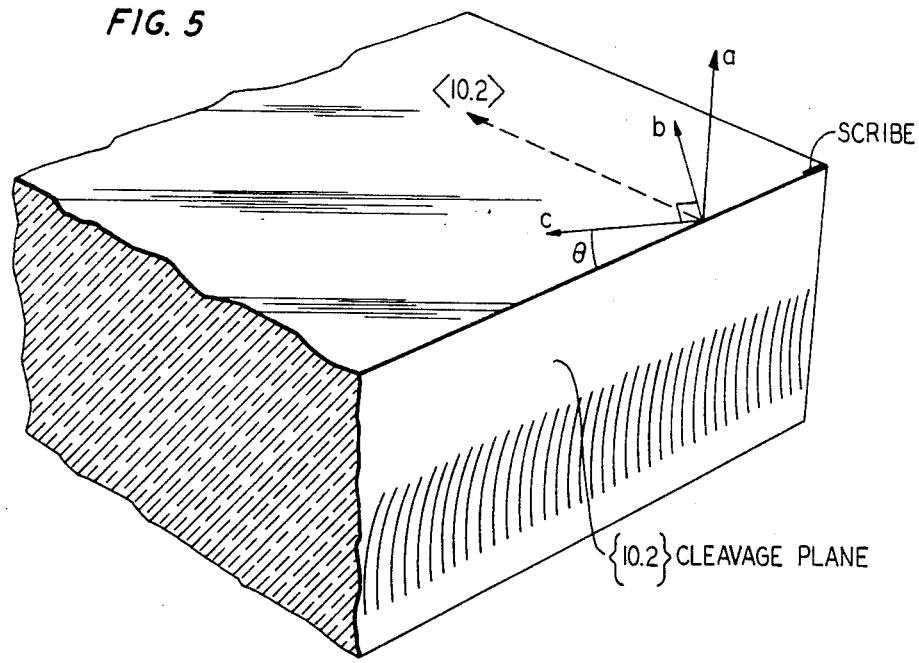
FIGS. 5 and 6 are pictorial illustrations of the end faces of a lithium niobate crystal, which illustrations are useful in describing how to make a device using the present invention.
Figure 6:
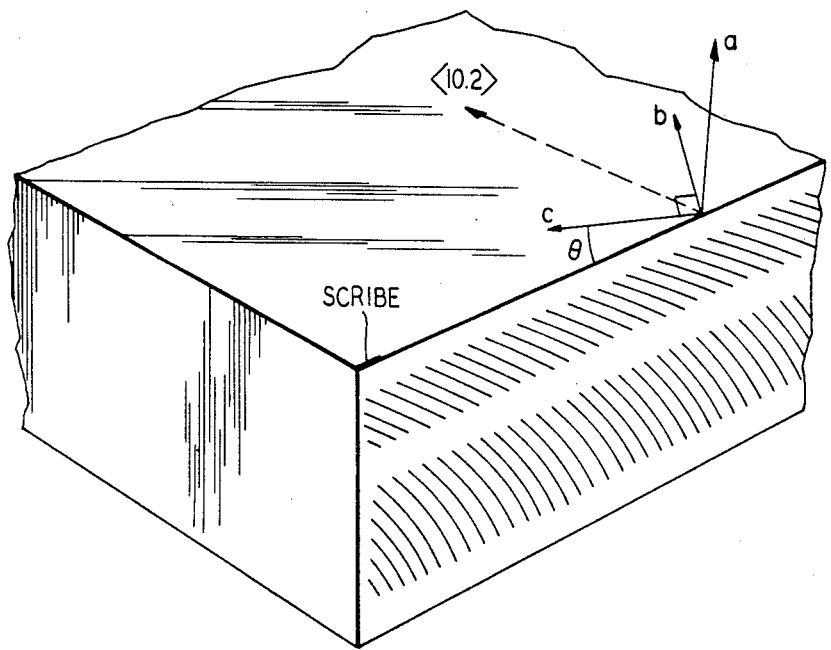

As indicated in FIG. 5 of the drawings, the c axis for a lithium niobate crystal is in a plane parallel to the top surface of the crystal at an angle of $\theta$ (equal to 32.75 degrees) from the [10.2] cleavage plane. If the scribe mark is placed near the negative end of the c axis as indicated in FIG. 5, a single series of terraces appears on the end face of the crystal. If, on the other hand, the scribe mark is placed near the positive end of the c axis as indicated in FIG. 6, a double series of terraces appears on the end face of the crystal. Using a reflection interference microscope it has been observed that the cleaved end having the double series of terraces as in FIG. 6 presents a nearly flat surface with many terraces having small step heights less than a few hundred Å. If, on the other hand, the break starts near the negative end of the c axis as in FIG. 5, the cleaved end with single series of terraces presents a face that is often conchoidal and contains few terraces. To obtain the flat end surface which is necessary in a Fabry-Perot resonator, the break which provides a double series of terraces has always been found to be superior.

After the proper dimensions have been established in the lithium niobate crystal with cleaved ends, a waveguide can then be established in the top surface of the crystal by diffusing a metal such as titanium along a predetermined width of the top surface of the crystal. In the embodiment constructed, a waveguide was established in a 4-centimeter long crystal by diffusing a 4-micrometer wide and 180 Å thick titanium strip for 5 hours at 1050 degrees Centigrade in the presence of flowing oxygen. The crystal used was a standard acoustic graded lithium niobate substrate obtained from Crystal Technology Incorporated. The 99.9 percent pure titanium was evaporated from a tungsten coil.

If it is desired to generate an ordinary wave in the waveguide, the light that is coupled to the crystal can be polarized normal to the crystal plate, that is, parallel to the a axis and perpendicular to the c axis, and the guide can be fabricated in the crystal perpendicular to the cleaved ends. See the article entitled "Integrated Bistable Optical Devices" by P. W. Smith, I. P. Kaminow, P. J. Maloney and L. W. Stulz, *Applied Physics Letters*, Vol. 33, No. 1, July 1, 1978, pages 24-26. since the index of refraction of lithium niobate is relatively close to the refractive index of air, it is usually necessary to provide some additional reflection in addition to that which is provided by the cleaved ends. Metal mirrors can be deposited on the end faces or, as indicated in the embodiment to be discussed hereinbelow, this additional reflection can be advantageously provided by a multilayered dielectric mirror of the type commonly used in gas laser systems. If, on the other hand, a birefringent crystal other than lithium niobate or lithium tantalate is used having a refractive index much different from that of air, the cleaved ends by themselves may provide adequate reflection for the desired Fabry-Perot resonator.

In order to achieve a strong electro-optic effect, it is desirable to establish in extraordinary wave in the metal diffused waveguide of the birefringent crystal. Such a wave cannot be established in a LiNbO$_3$ birefringent crystal Fabry-Perot resonator where the guide is positioned perpendicular to the cleaved ends. If the incoming light is oriented to be perpendicular to the cleaved end and polarized in the plane of the crystal plate to establish an extraordinary wave, the Poynting vector will not be parallel to the waveguide axis. To make the Poynting vector parallel to the waveguide axis the incident beam must be oriented so as to enter at about 4.5 degrees from the normal. Under the latter circumstances the Poynting vector can be made parallel to the guide axis, but the wave normal vector is then about 2 degrees from the guide axis and the wave fronts are no longer parallel to the cleaved faces. Under these circumstances no Fabry-Perot maxima or minima are observed.

Figure 1:
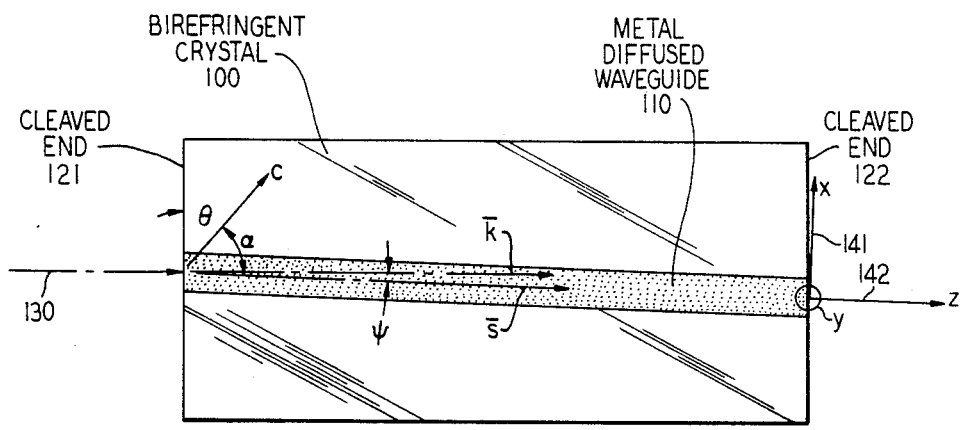
FIG. 1 is a diagram of a Fabry-Perot resonator constructed in accordance with the present invention.

In accordance with the present invention, the desired maxima and minima of a Fabry-Perot resonator are achieved in combination with a Poynting vector that is parallel to the waveguide axis by positioning the waveguide at an oblique angle with respect to the cleaved ends. In FIG. 1 the top view of a birefringent crystal 100 is shown where cleaved ends 121 and 122 are established perpendicular to the plane of the drawing at an angle of $\theta$ with respect to the c or unique axis of the birefringent crystal 100. A metal diffused waveguide 110 made of diffused titanium metal is established in the birefringent crystal at an angle of $\Psi$ with respect to a vector that is normal to the cleaved end 121. The angle between the c axis and the waveguide axis is designated as $\alpha$ in FIG. 1. For any input beam 130 of optical radiation that is positioned perpendicular to cleaved end 121 and oriented so as to enter waveguide 110, an extraordinary wave can be established in the waveguide whose Poynting vector $\bar{S}$ is coincident with the waveguide axis and whose wave normal vector $\bar{k}$ is perpendicular to the cleaved end by satisfying the following equations:

$$\alpha + \theta - \psi = 90° \tag{1}$$

$$\psi = \tan^{-1}(-\epsilon_{xz}/\epsilon_{xx}) \tag{2}$$

where $$\epsilon_{xz} = (n_3^2 - n_1^2)\sin\alpha\cos\alpha \tag{3}$$

and $$\epsilon_{xx} = n_1^2 \cos^2\alpha + n_3^2 \sin^2\alpha \tag{4}$$

Equation 1 is simply an expression of the relationship between the angles illustrated in FIG. 1. Equation 2 determines the value of $\Psi$ in terms of the elements of the dielectric tensor $\epsilon_{xz}$ and $\epsilon_{xx}$ in the coordinate system where z is coincident with the waveguide axis and Poynting vector, and x is in the plane of the crystal. This latter xyz coordinate system is illustrated in FIG. 1 by vectors 141 and 142. Equations 3 and 4 are expressions for the elements of the dielectric tensor $\epsilon_{xz}$ and $\epsilon_{xx}$, respectively, in terms of α, the angle between the c axis of the birefringent crystal and the waveguide axis, $n_3$ is the index of refraction for polarization parallel to the c axis, and $n_1$ is the index of refraction for polarization perpendicular to the c axis. Equations 1–4 provide a set of transcendental equations that may be solved in an iterative fashion to provide a self-consistent solution for any birefringent crystal. If lithium niobate is used as the birefringent crystal 100, θ is equal to 32.75 degrees and $n_1$ equals 2.27 and $n_3$ equals 2.19 at a wavelength of 0.7 micrometers. For these parameters the above equations when solved provide a value of Ψ equal to about 2.0 degrees. Hence, for lithium niobate, if the titanium diffused waveguide is established in the birefringent crystal at an angle of about 2 degrees from a normal to the cleaved end, beam 130 having a wavelength of 0.7 micrometers can be polarized in the plane of the crystal and an extraordinary wave is established in waveguide 110 whose Poynting vector is coincident with the waveguide axis and whose wave normal vector is perpendicular to the cleaved ends. In such a crystal of lithium niobate the electro-optic effect has been determined to be about 3.1 times greater than for the ordinary wave.

Figure 2:
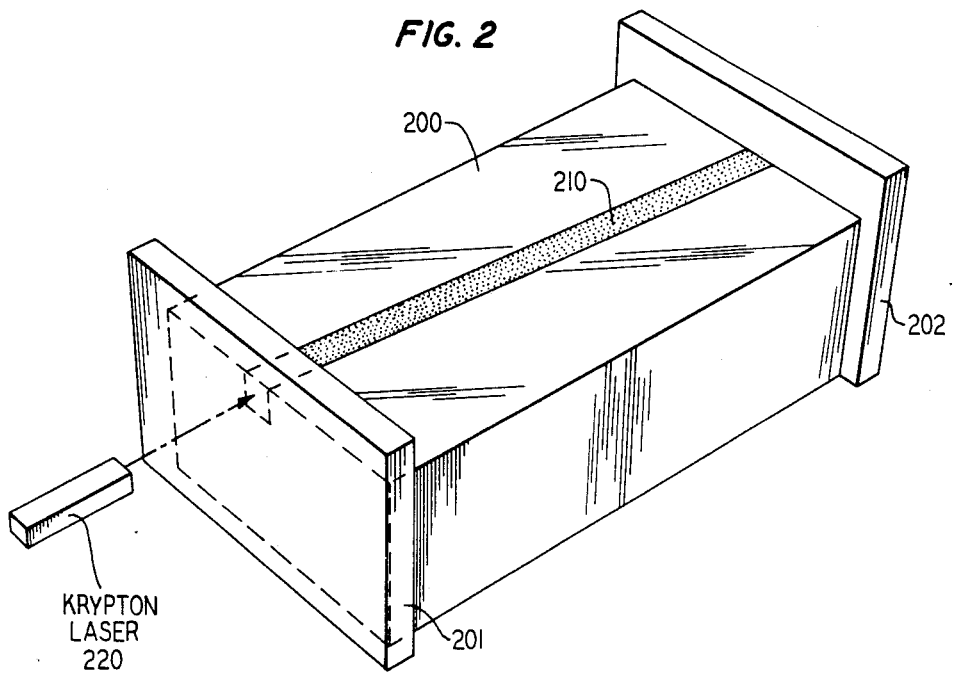
FIG. 2 is a pictorial illustration of a laser that uses the present invention.

FIG. 2 illustrates an optically pumped laser that can be constructed in accordance with the principles of the present invention. A uniaxial crystal 200, such as lithium niobate or lithium tantalate that has been doped with a 1 percent concentration of neodymium, is cut to the proper thickness and width and cleaved to the proper length as discussed hereinabove in connection with FIG. 1. A waveguide 210 is established in crystal 200 by diffusing titanium along a waveguide axis that is about 2 degrees with respect to a normal to the cleaved end. A multilayered dielectric mirror 201 is cemented at one end of the crystal 200 and a second multilayered dielectric mirror 202 is cemented at the other end of crystal 200. Mirror 201 is constructed so as to pass the radiation at 7525 Å from a krypton laser 220 and to be as highly reflective as possible to radiation at a wavelength of 1.08 micrometers. Mirror 202 on the other hand is constructed so as to be as highly reflective as possible to the wavelength of 7525 Å and to be only partially reflective to the wavelength of 1.08 micrometers. This lithium niobate laser when pumped by a krypton laser at a wavelength of 7525 Å oscillates at about 1.08 micrometers with an extraordinary wave propagating in waveguide 210.

Figure 3:
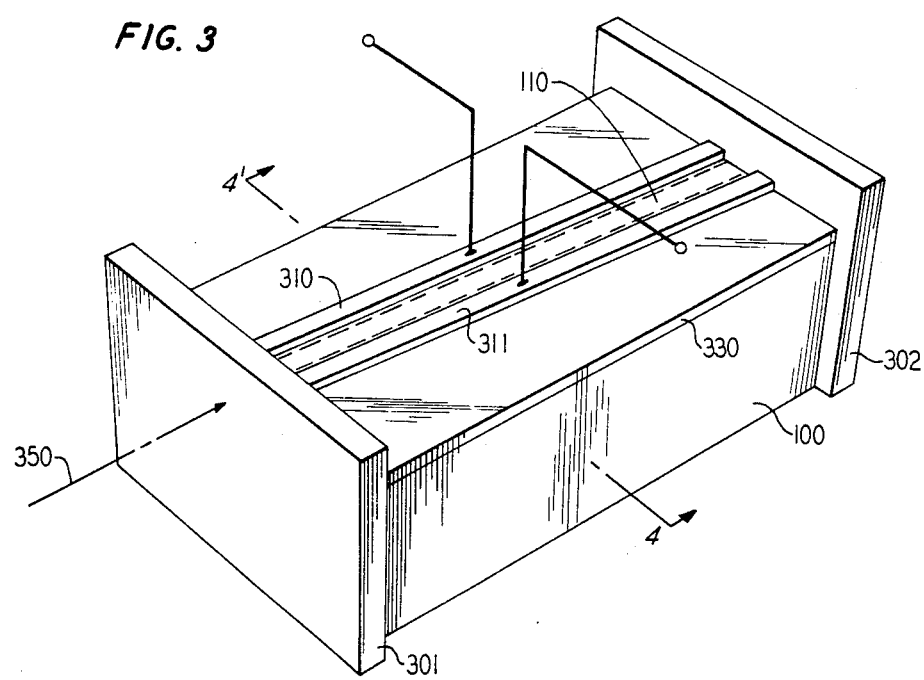
FIG. 3 is a pictorial illustration of an electrically controllable Fabry-Perot resonator using the present invention.
Figure 4:
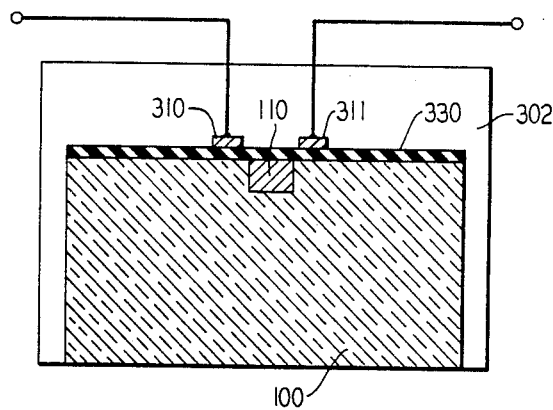
FIG. 4 is a cross-sectional diagram of the device shown in FIG. 3.

The invention can also be practiced in an electrically controlled Fabry-Perot interferometer of the type that can be used in the devices disclosed in the above-identified article by Smith et al. To construct this device a lithium niobate crystal with a titanium diffused waveguide identical to that shown in FIG. 1 is first constructed. As indicated in FIG. 3, the top surface of the birefringent crystal 100 is then completely overcoated with a 2000 Å thick layer 330 of aluminum oxide which is placed on the top surface of the crystal by sputtering aluminum oxide in a 1-to-1 oxygen and argon atmosphere. Layer 330 is then further oxidized to reduce its discoloration by heating it in oxygen at 500 degrees Centigrade for 2 hours. Metal electrodes 310 and 311 consisting of 300 Å of titanium and 700 Å of silver are then evaporated on to the dielectric layer 330 at positions that are over or near to waveguide 110 in crystal 100. The position of the electrodes with respect to the dielectric layer 330 and waveguide 110 is also illustrated in FIG. 4, which is a cross-sectional diagram of cross-section 4—4' in FIG. 3. Each electrode is 20 micrometers wide and the electrodes are spaced by about 9 micrometers. By using the dielectric layer 330 the influence of the metal electrodes on the wave propagation in waveguide 110 is considerably reduced. Multilayer dielectric mirrors 301 ad 302 are then oriented and cemented at each cleaved end of crystal 100 in order to provide additional reflection to the radiation introduced by beam 350.

What has been described hereinabove are merely illustrative embodiments of the present invention. Numerous departures may be made by those skilled in the art without departing from the spirit and scope of the present invention. For example, any other birefringent crystal may be utilized and if its index of refraction is sufficiently different from that of air, the multilayered dielectric mirrors may be completely eliminated. In addition, other type mirrored surfaces may be utilized to provide the additional reflection at the cleaved ends of a lithium niobate or lithium tantalate crystal. For example, silver may be disposed directly on to the cleaved ends since these ends have a high degree of parallelism. When using a silvered or aluminum reflecting surface, it may be necessary to provide a space between the ends of electrodes 310 and 311 and the cleaved ends of crystal 100 in order to prevent any shorting of the potential that is applied to the electrodes.

I claim:

1. A Fabry-Perot resonator comprising a birefringent crystal (100) having at least two parallel cleaved ends (121 and 122), and a strip waveguide (110) in said crystal between said two ends, characterized in that, said strip waveguide is oriented in said crystal so as to intercept said cleaved ends at an oblique angle.

2. A Fabry-Perot resonator as defined in claim 1 wherein said crystal is lithium niobate and said strip waveguide is established in said crystal by the presence of diffused titanium.

3. A Fabry-Perot resonator as defined in claim 1 wherein the resonator further includes two mirrors (201 and 202) each one of which is bonded to one of said two parallel cleaved ends.

4. A Fabry-Perot resonator as defined in claim 3 wherein said mirrors are multilayered dielectric mirrors.

5. A Fabry-Perot resonator as defined in claim 3 wherein said crystal is composed of lithium niobate doped with neodymium.

6. A Fabry-Perot resonator as defined in claim 3 wherein said resonator further includes a dielectric layer (330) overcoating the surface of said crystal that contains said waveguide, and at least two metal electrodes (310 and 311) deposited on said dielectric layer near said waveguide and extending parallel to said waveguide by substantially the entire length of said waveguide.

7. A Fabry-Perot resonator comprising a birefigent crystal (100) having at least two parallel cleaved ends and a c axis that lies in a plane parallel to the top surface of said crystal, and a strip waveguide (110) in the top surface of said crystal, characterized in that, said strip waveguide is oriented with its axis at an angle of $\Psi$ with respect to a perpendicular drawn to either one of sid two parallel cleaved ends, such that the magnitude of $\Psi$ is greater than zero.

8. A Fabry-Perot resonator as defined in claim 7 wherein the c axis is at an angle $\theta$ with respect to one of said two parallel cleaved ends and at an angle $\alpha$ with respect to the axis of said waveguide, the angle $\Psi$ is substantially defined by the following equations:

$$\alpha + \theta - \psi = 90° \quad (1)$$

$$\psi = \tan^{-1} - \epsilon_{xz}(\epsilon_{xx}) \quad (2)$$

where $$\epsilon_{xz} = (n_3^2 - n_1^2) \sin \alpha \cos \alpha \quad (3)$$

and $$\epsilon_{xx} = n_1^2 \cos^2 \alpha + n_3^2 \sin^2 \alpha \quad (4)$$

where $\epsilon_{xz}$ and $\epsilon_{xx}$ are elements of the dielectric tensor in the coordinate system where z is parallel to the waveguide axis, $n_3$ is the index of refraction of said crystal for polarization parallel to the c axis, and $n_1$ is the index of refraction of said crystal for polarization perpendicular to the c axis.

9. A Fabry-Perot resonator as defined in claim 7 wherein the resonator further includes two mirrored surfaces (201 and 202) each one of which is bonded to one end of said cleaved ends.

10. A Fabry-Perot resonator as defined in claim 9 wherein the resonator further includes a dielectric laye (330) overcoating the top surface of said crystal and at least two electrodes (310 and 311) deposited on the surfaces of said dielectric layer substantially parallel to said waveguide and extending for substantially the entire length of said waveguide.

* * * * *

UNITED STATES PATENT AND TRADEMARK OFFICE
CERTIFICATE OF CORRECTION

PATENT NO. : 4,198,115
DATED : August 16, 1978
INVENTOR(S) : Ivan P. Kaminow

It is certified that error appears in the above-identified patent and that said Letters Patent are hereby corrected as shown below:

Column 7, line 2, "sid" should read --said--;
line 14, "$-\varepsilon_{xz}(\varepsilon_{xx})$" should read -- $-\varepsilon_{xz}/\varepsilon_{xx}$ --.
Column 8, line 14, "laye" should read --layer--.

Signed and Sealed this

Thirtieth Day of September 1980

[SEAL]

Attest:

SIDNEY A. DIAMOND

Attesting Officer         Commissioner of Patents and Trademarks